Figure 9:
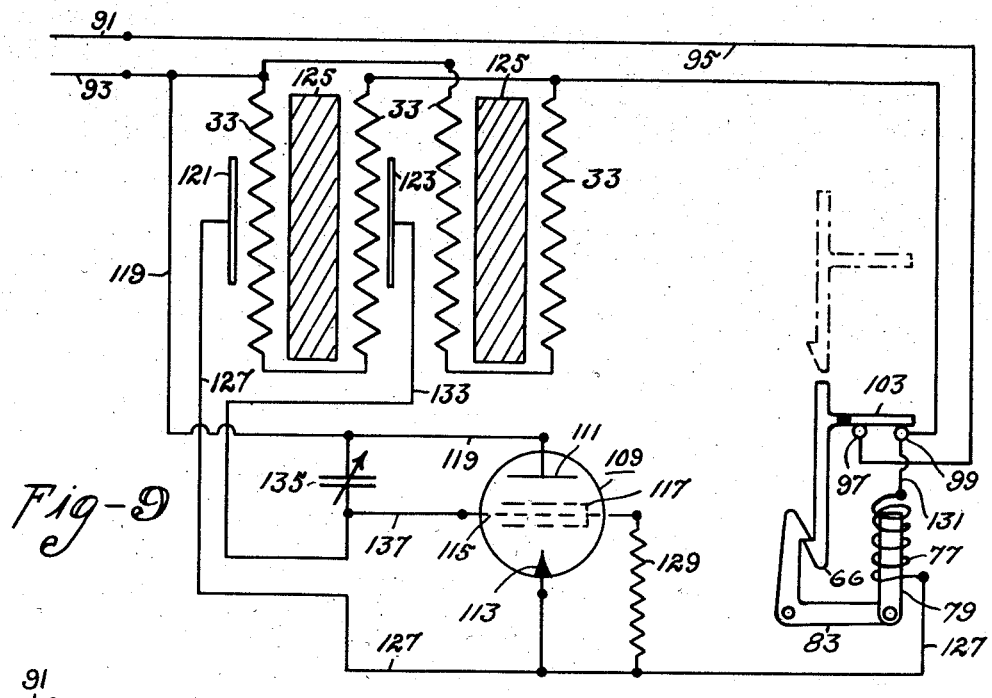

May 20, 1952      B. G. OLVING      2,597,023
AUTOMATIC ELECTRIC TOASTER
Filed Aug. 11, 1948      7 Sheets-Sheet 1
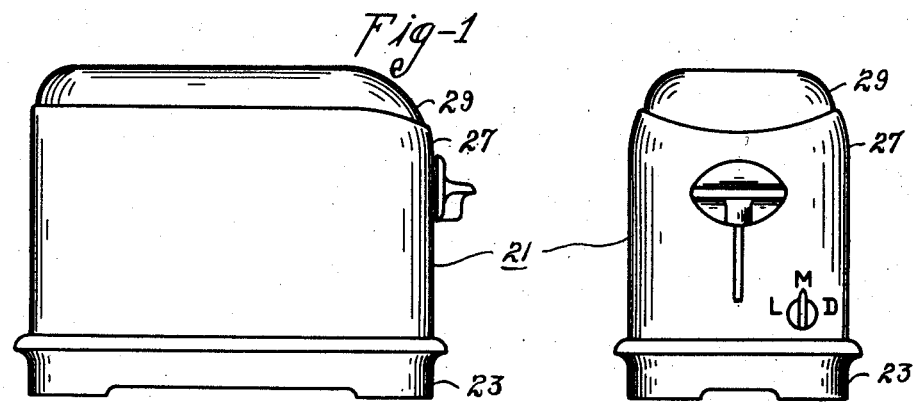
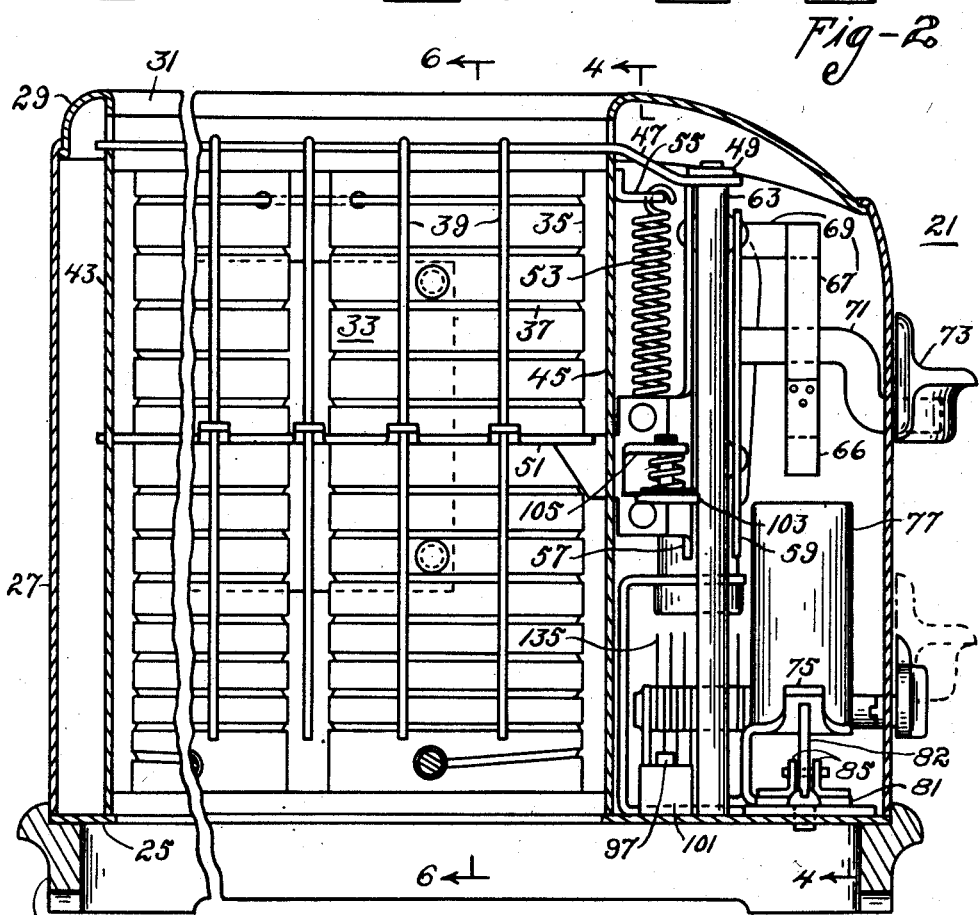
INVENTOR.
BROR G. OLVING

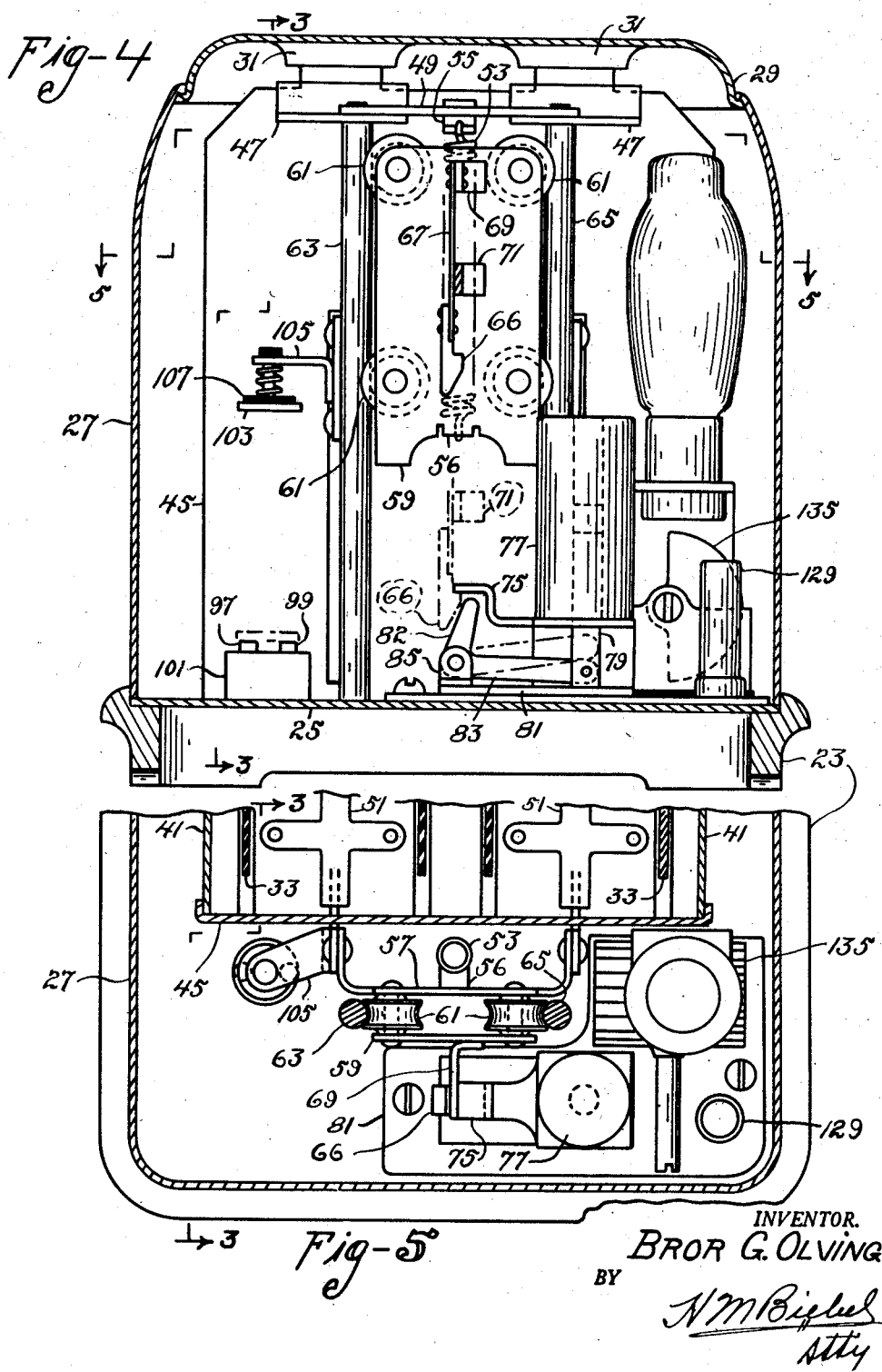

May 20, 1952  B. G. OLVING  2,597,023
AUTOMATIC ELECTRIC TOASTER
Filed Aug. 11, 1948  7 Sheets-Sheet 3
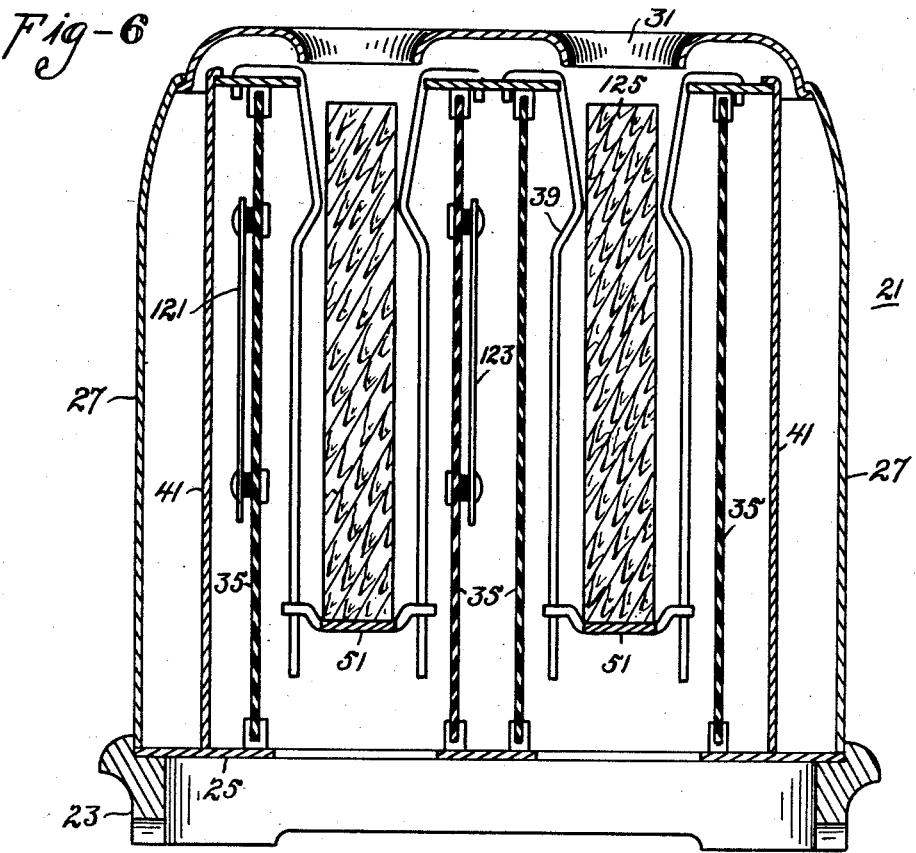
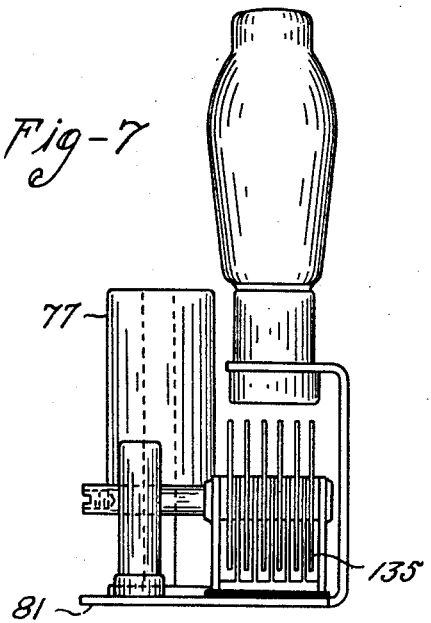
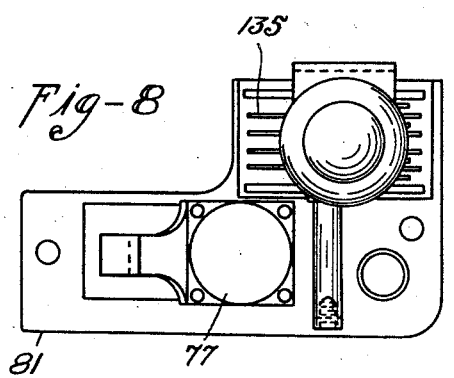
INVENTOR.
BROR G. OLVING
BY

INVENTOR.
BROR G. OLVING

INVENTOR.
BROR G. OLVING

May 20, 1952  B. G. OLVING  2,597,023
AUTOMATIC ELECTRIC TOASTER
Filed Aug. 11, 1948  7 Sheets-Sheet 6

INVENTOR.
BROR G. OLVING
BY
Oscar W. Tiere

INVENTOR.
BROR G. OLVING
BY

Patented May 20, 1952

2,597,023

UNITED STATES PATENT OFFICE 2,597,023

AUTOMATIC ELECTRIC TOASTER

Bror G. Olving, Elgin, Ill., assignor to McGraw Electric Company, Elgin, Ill., a corporation of Delaware Application August 11, 1948, Serial No. 43,717

21 Claims. (Cl. 99—331)

My invention relates to automatic electric toasters and particularly to means for terminating a toasting operation. This application is a continuation in part of my co-pending application S. N. 574,595, filed January 25, 1945, now abandoned.

An object of my invention is to provide a means for terminating a toasting operation and an electric circuit therefor which are dependable and which will stand up in service for a long period of time.

Another object of my invention is to provide a means for terminating a toasting operation, the performance of which depends on the inherent electrical characteristics of its component parts and the operation of which is not dependent on nor controlled by any energy supplied from mechanical or thermal storage devices.

Another object of my invention is to provide means for terminating a toasting operation, the performance of which depends on the changing dielectric characteristics of the product being toasted, the product itself being utilized as a dielectric in an electrostatic condenser which comprises a part of the electric control circuit.

Another object of my invention is to provide means for terminating a toasting operation, the length of which is entirely independent of thermal, mechanical or electric timing means and the termination of which is effected directly by the condition of the product being toasted.

Another object of my invention is to provide a control circuit for a toaster which responds to the changing dielectric characteristics of the product being toasted, which circuit is stable and dependable in operation and is substantially unaffected by extraneous electric fields and the like.

Another object of my invention is to provide a means for terminating a toasting operation and an electric circuit therefor, including an electron tube to obtain the above mentioned performance.

Figure 10:
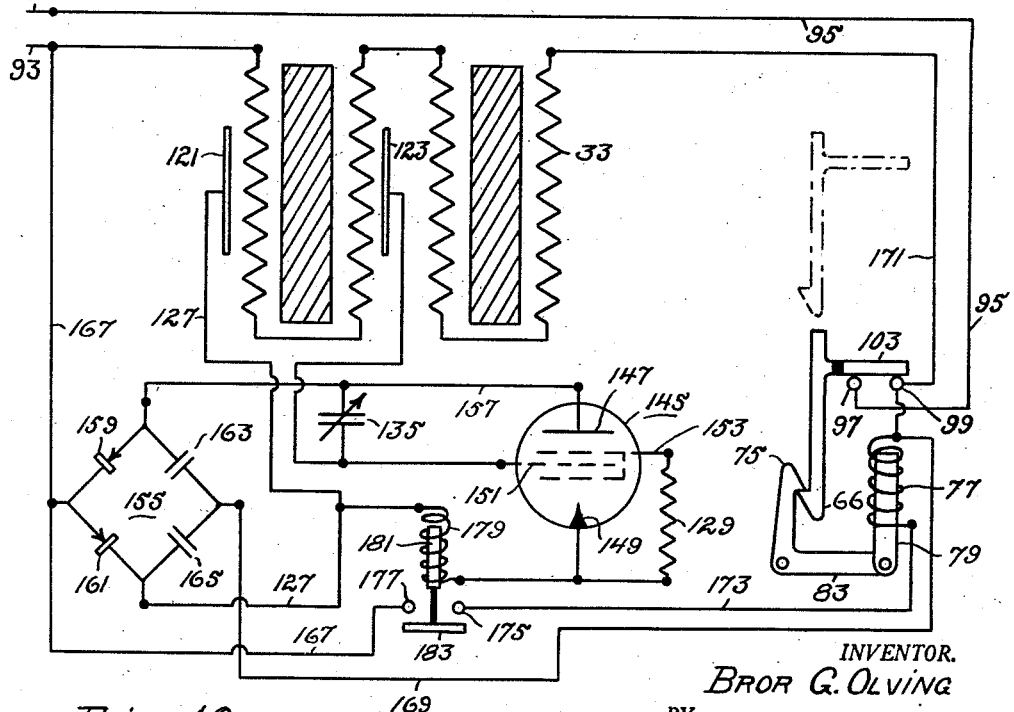
Figure 11:
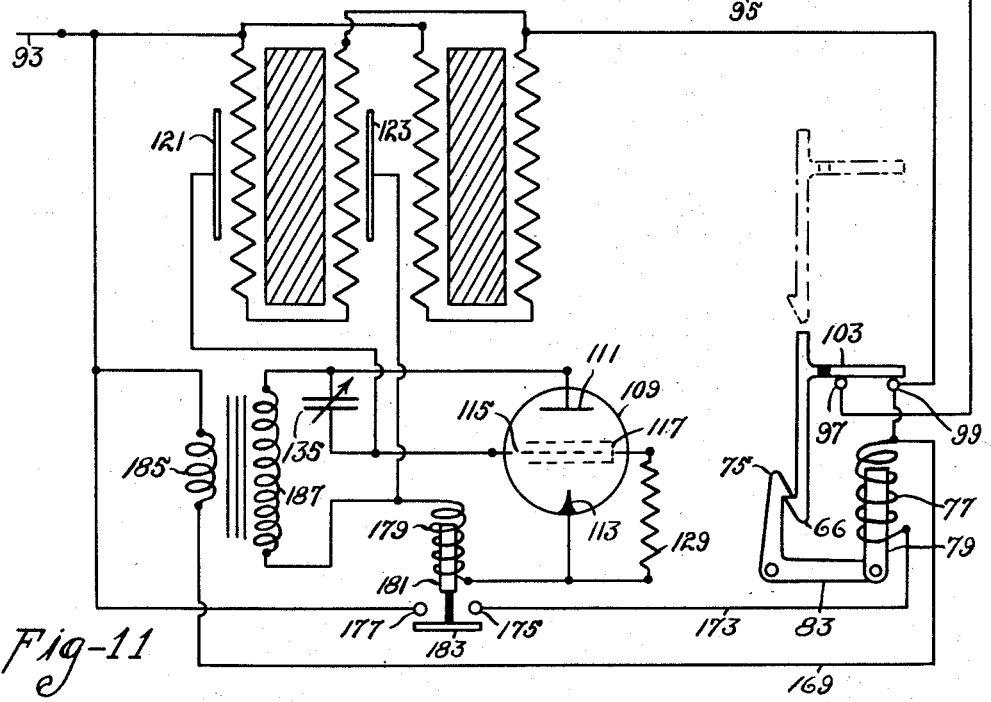
Figure 12:
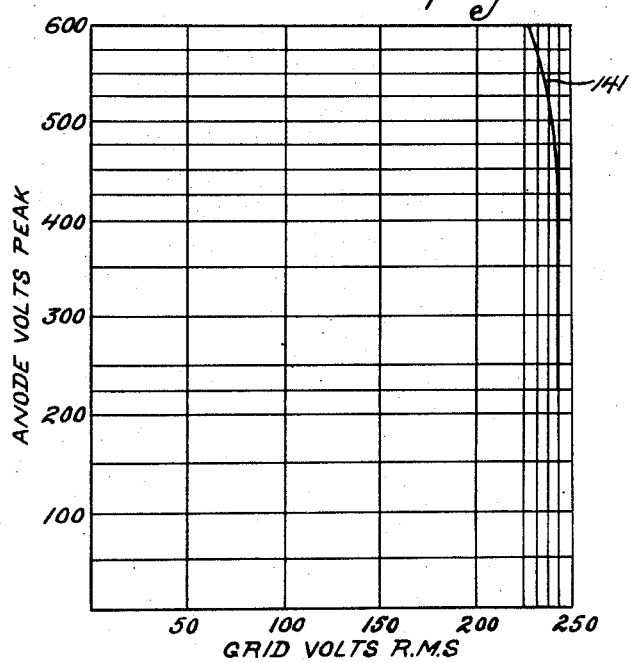
Figure 13:
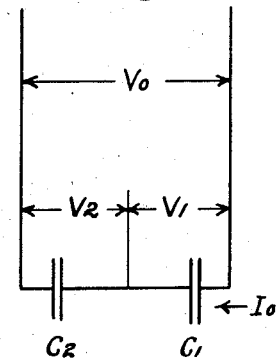
Figure 15:
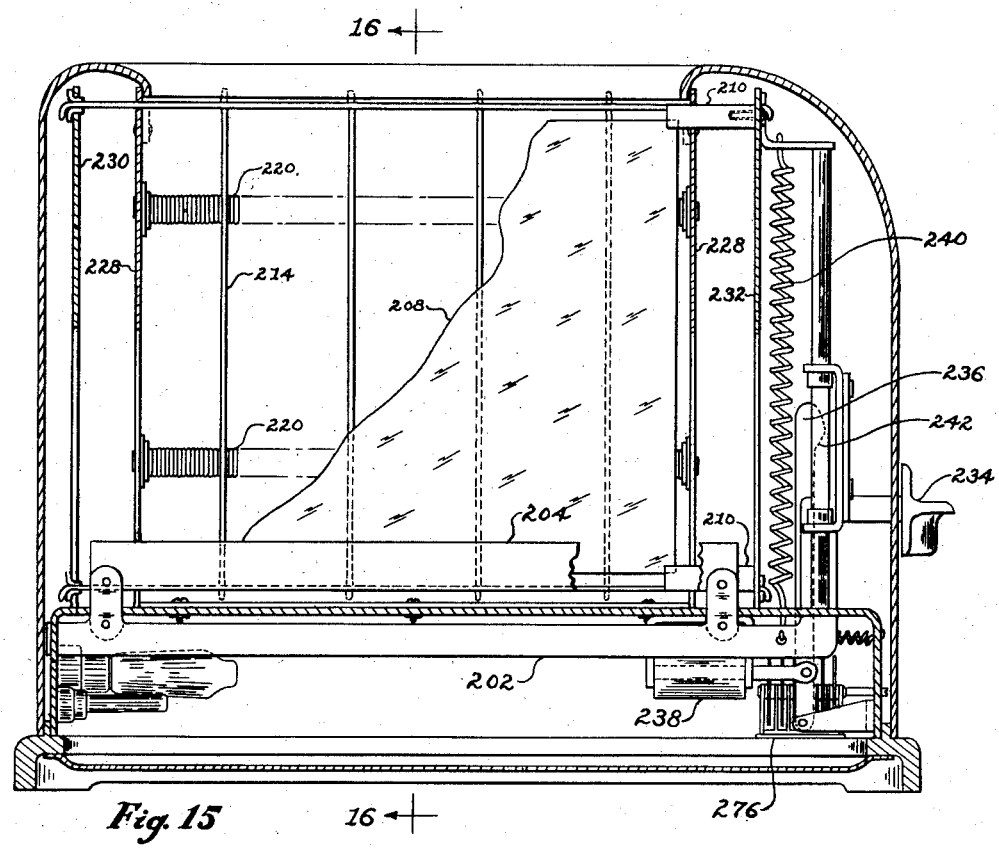
Figure 14:
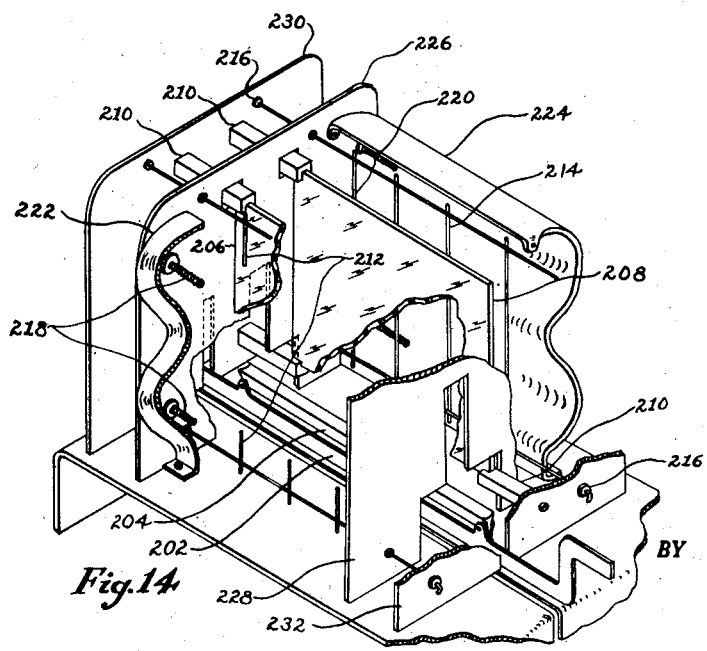
Figure 16:
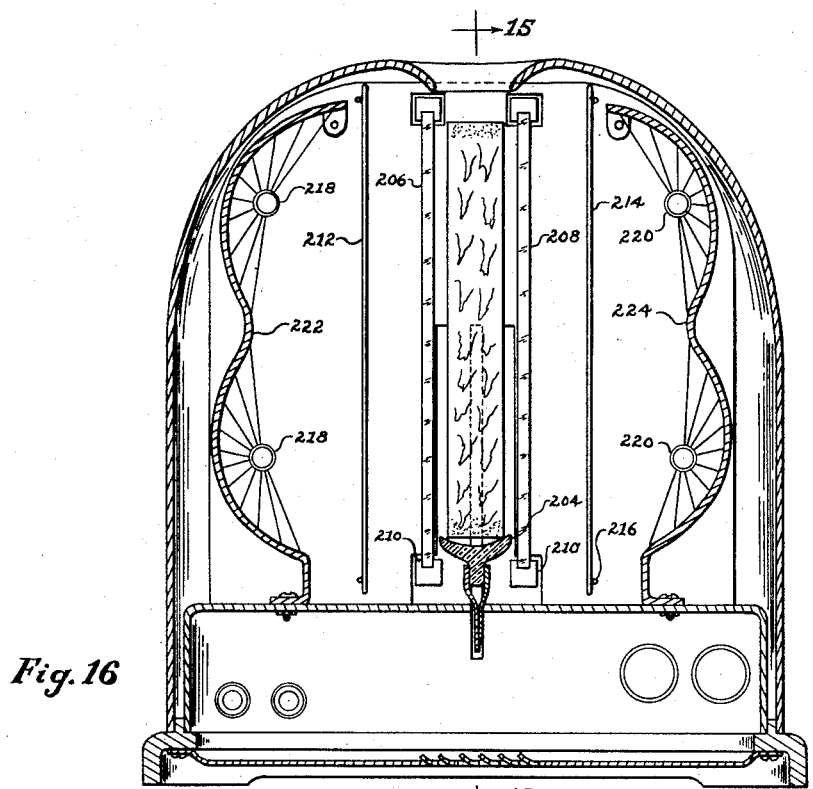
Figure 17:
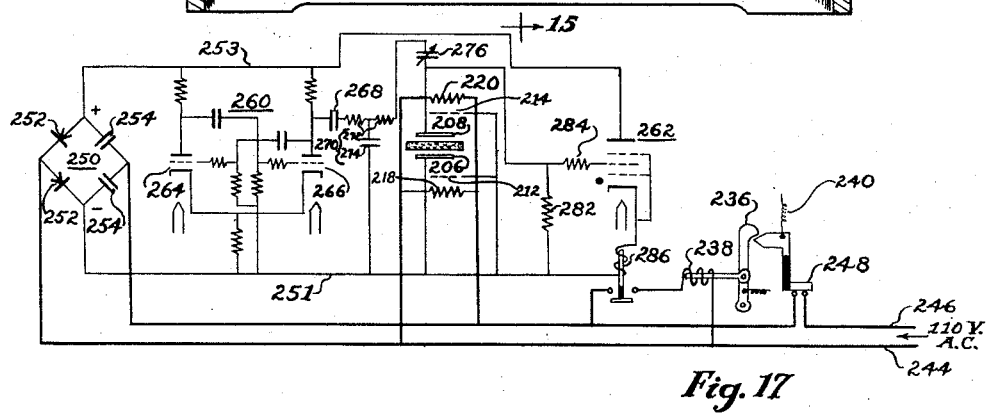

In the drawings,

Figure 1 is a side, elevational view of an electric toaster embodying my invention, Fig. 2 is a front, elevational view thereof, both Figs. 1 and 2 being on a reduced scale, Fig. 3 is a longitudinal, vertical, sectional view through a toaster on the line 3—3 of Figs. 4 and 5, with the parts shown in non-toasting position, Fig. 4 is a vertical, lateral, sectional view taken on the line 4—4 of Fig. 3, with parts shown in their non-toasting positions, Fig. 5 is a fragmentary, horizontal, sectional view taken on the line 5—5 of Fig. 4, Fig. 6 is a vertical, lateral, sectional view taken on the line 6—6 of Fig. 3, Fig. 7 is a vertical end view of the electronic means, Fig. 8 is a top plan view of the electronic means, Fig. 9 is a diagram of electric circuits for the toaster heating elements in relation to the elements of the electronic toasting operation terminating means when in toasting position, Fig. 10 is a modification of the diagram of Fig. 9, showing the addition of an intermediate relay and of voltage doubling means, Fig. 11 is a modification of electric circuits of Figs. 9 and 10, showing the use of a transformer instead of the voltage doubling means of Fig. 10, Fig. 12 is a graph showing the electrical characteristics of the electron tube used in Figs. 9, 10, and 11, Fig. 13 is a diagram of circuits showing the electrical characteristics of two condensers connected in series electric circuit relatively to each other, Fig. 14 is a pictorial view of an additional toaster embodying the present invention, Fig. 15 is a longitudinal sectional elevation thereof, Fig. 16 is a transverse section thereof taken substantially along the line 16—16 of Fig. 15, and, Fig. 17 is a schematic diagram of the circuits and controls of Figs. 14-16.

I have shown in Figs. 1, 2, and 3 a two-slice automatic electric toaster 21 comprising a base frame 23, which is preferably made of molded composition material and which has located against its upper surface a base plate 25, as well as the body of an outer casing 27. I provide further a cover member 29 which is adapted to have interfitting engagement with the outer casing and which is provided with a pair of openings 31, through which fresh slices of bread may be introduced into the toaster, and through which toasted slices of bread may be removed after having been toasted. I provide a pair of planar, vertical, electric heating elements 33 for each slice of bread to be toasted, each of which may comprise one or more sheets 35 of electric-insulating material, such as mica, on which is wound a strip or strand 37 of a suitable resistance material. I provide also a plurality of guard or guide wires 39 which serve to hold the individual slices of bread centrally between the pair of heating elements 33.

I provide two toasting chambers in a two-slice toaster, the toasting chambers being constituted by side baffle plates 41, one of the inner heating elements 33, and a rear intermediate wall 43, as well as a front intermediate wall 45. The upper end portions of the sheets of mica 35 may be supported in proper operative positions by a plurality of longitudinally extending top frame plates 47, which may be held in proper operative position by a cross bar 49. All of the elements hereinbefore mentioned are already old and well known in the art.

I provide further a bread carrier 51 in each of the toasting chambers, the rear end portions of which are adapted to extend outwardly through the rear intermediate wall 43, through slots provided for that purpose, while the front end portions are adapted to extend through slots provided for that purpose in the front intermediate wall 45. It is desired to normally yieldingly bias both bread carriers into the position shown in full lines in Fig. 3 of the drawings, which is the non-toasting position, and from which they may be moved downwardly into their lower or toasting position. For so biasing the carriers I provide a tension coil spring 53, having its upper end secured to a bracket 55 suitably secured against the front surface of the front intermediate wall 45, while the lower end thereof is adapted to be secured to a rearwardly projecting lug 56 which may constitute a part of a rear carriage plate 57, to which the front end portions of the respective bread carriers 51 are adapted to be secured. I provide further a front carriage plate 59, having therebetween four grooved rollers 61, one of each being positioned adjacent the four corners of the substantially rectangular plates 57 and 59. The outer grooved surfaces of the rollers 61 are adapted to engage the inner surface of two vertically extending standards 63 and 65, the lower ends of which fit into the base plate 25, while the upper ends thereof fit into front end portions of the top frame plates 47 and into the cross bar 49. This construction therefore biases the bread carriers into their upper non-toasting position, from which they may be moved downwardly by any suitable means into their lower toasting position.

Means for holding the bread carriers in their toasting positions comprise a hook member 66 secured to the lower end of a resilient spring bar 67, the upper end of which is secured to a bracket 69 which is suitably secured against the front surface of the front carriage plate 59. I provide further a forwardly extending bar 71 secured to the front carriage plate 59 and moving in a slot in the front wall of the casing 27. A knob 73 is positioned on the front end of bar 71 and permits of moving the bread carriers, as well as the other parts secured thereto, downwardly into the positions shown in broken lines in Fig. 4 of the drawings. The spring bar 67 is biased in a counterclockwise direction so that it will normally engage the left hand face of a part of the bar 71.

The hook member 66 is adapted to engage the end of a substantially horizontally-extending latch bar 75 secured against the lower end of an electromagnetic latch release comprising a coil 77 and a vertically movable armature core 79 mounted on a plate 81. The armature core 79 is pivotally connected with a release means comprising a bell crank lever having a short vertical arm 82 and a long arm 83 pivotally supported by a bracket 85. Armature core 79 is pivotally connected to the free outer end of arm 83 as will be seen by reference to Fig. 4 of the drawings, and when the coil 77 is traversed by a current, then armature core 79 will be drawn upwardly, causing a counter-clockwise turning movement of arms 83 and particularly of arm 82, with the result that arm 82 will engage the slanting surface of the right hand face of hook member 65 to cause its movement out of engagement with the end of latch member 75.

Referring now to Fig. 9 of the drawings, I have there shown a diagram of connections which constitutes the means for terminating a toasting operation. I provide a pair of supply circuit conductors 91 and 93 adapted to provide alternating current, of which conductor 91 is connected by a conductor 95 to one fixed contact 97 of a main switch adapted to control the energization of the four toast heating elements 33. I provide a second fixed contact 99, which contacts are adapted to be positioned against the upper surface of base plate 25 as by a block 101 of electric-insulating material. I provide a contact bridging member 103 which is resiliently supported from a bracket 105 secured to the rear carriage plate 57. The contact bridging member 103 is supported as by a block 107 of electric-insulating material and is adapted to engage with the fixed contacts 97 and 99 when the bread carriers have been moved into their toasting positions.

I provide further a cold cathode type of grid controlled tube 109 having a plate anode 111, a cold cathode 113, together with a grid 115, and a screen grid 117. Plate anode 111 is connected by a conductor 119 with supply circuit conductor 93 and with one terminal of two of the heating elements 33 which are connected in parallel electric circuit relatively to each other, as is shown particularly in Fig. 9 of the drawings.

I provide two metallic plates 121 and 123, which are secured on the plates 35 of mica by any suitable or desired electric-insulating means, they being positioned on the mica on that side thereof away from the center of the toasting chamber which will be occupied by a slice of bread 125. The two metallic plates 121 and 123 are adapted to constitute a condenser, the slice of bread 125 being the major dielectric therebetween. Plate 121 is connected by a conductor 127 with the cathode 113 and to one terminal of a resistor 129, having a resistance on the order of 50,000 ohms, as well as to one terminal of coil 77 of the electromagnetic release means. The other terminal of coil 77 is connected by a conductor 131 to fixed contact 99. The other terminal of resistor 129, which has the purpose of making the tube more sensitive and more accurate in its performance, is connected to the screen grid 117. Plate 123 is connected by a conductor 133 to one terminal of a suitable adjustable condenser 135, the other terminal of which is connected to conductor 119. The junction of the two mentioned terminals of the two condensers 135 and the condenser constituted by plates 121 and 123 is connected with the grid 115 by a conductor 137.

The electrostatic capacitance of the condenser constituted between plates 121 and 123 is directly proportional to the area of the plates and to the dielectric constant (or the specific inductive capacity) of the material occupying the space between the plates and is inversely proportional to the distance between the plates. When there is no bread in the toasting compartment, most of the space between the two plates is occupied by air, except for the two narrow parallel planes occupied by the two heating elements 33. These heating elements comprise turns of narrow resistance wire spaced relatively far apart. When a slice of bread 125 is inserted in the toasting compartment between the plates 121 and 123, the electrostatic capacitance of the condenser increases considerably, due to the relatively high dielectric constant of the moist bread (the dielectric constant of water being 80 and that of air being 1). As the bread is toasted, most of the moisture within the bread gradually evaporates and the dielectric constant or the specific capacitance of the bread decreases, thereby also decreasing the electrostatic capacity of the condenser constituted by the two plates 121 and 123.

The higher the degree of toasting the more moisture is evaporated from the slice of bread; that is a "light" piece of toast contains more moisture than a "medium" piece of toast, and a "medium" piece of toast contains more moisture than a "dark" piece of toast. The electrostatic capacitance of the condenser therefore becomes smaller the longer the piece of bread is toasted, and consequently the electrostatic capacity of a dark piece of toast is less than that of a medium piece of toast, and the electrostatic capacity of a medium piece of toast is less than that of a light piece of toast.

Referring now to Fig. 9 of the drawings, the grid controlled rectifier tube 109 used in this circuit is of the positive grid bias type. Thus the tube is not conducting when the positive voltage on the grid is below a certain critical minimum value, but becomes conducting as soon as the voltage on the grid has reached such a value. The voltage impressed across the tube 109 between the plate 111 and the cathode 113 is distributed across the two condensers 135 and that constituted by the plates 121 and 123 in inverse proportion to the electrostatic capacitances, as is well known in the art.

At the start of a toasting operation the electrostatic capacitance of the condenser constituted by the plates 121 and 123 has its maximum value, as the fresh slice of bread is moist and the voltage across the condenser is therefore relatively low. As the slice of bread is dried out during the progress of the toasting operation, the electrostatic capacitance of the condenser constituted by the plates 121 and 123 gradually decreases and the voltage between the two plates gradually increases. Condenser 135 is an air condenser of the variable type and its size is matched to that of the condenser constituted by the two plates 121 and 123.

When two condensers are connected in series across a circuit, the equivalent total capacitance is equal to the product of the individual capacitances divided by the sum of the individual capacitances. From this we obtain that $V_2$ (see Fig. 13) is equal to $C_1 \times V_1$ divided by $C_2$. That is, the voltage drop across condensers $C_1$ and $C_2$ is inversely proportional to their respective capacitances; or, in other words, the voltage across condenser $C_2$ increases when its electrostatic capacitance decreases.

Referring now to Fig. 12 of the drawings, I have shown a curve 141 which is the control characteristic of a cold cathode grid glow tube, which I may use as the electron tube 109. Referring to curve 141, it will be seen that if an alternating current having a peak voltage between 250 and 400 volts is impressed across the plate anode circuit, the tube will become conducting or will fire, if a positive peak voltage of 245 volts is impressed between the grid 115 and the cathode 113. Assume that we choose 350 volts as a suitable peak voltage to be impressed across the plate circuit of the tube, then we will find that to obtain a grid voltage of 245 volts between the grid 115 and the cathode 113, the capacitance of the condenser 135$C_1$ must be equal to 2.39 times the capacitance of condenser $C_2$ (constituted by the plates 121 and 123) or $$C_1 = \frac{245}{350-245} C_1 = 2.39 C_2$$

which means that at the termination of the toasting cycle the capacity of the variable condenser 135 ($C_1$) in Fig. 13 must be equal to 2.39 times the capacity of the bread toasting compartment condenser $C_2$. To compute the actual value of the variable condenser $C_2$, it is therefore necessary to know the electrostatic capacitance of the bread toasting compartment, one value being obtained with light toast on the bread rack, another value with medium toast on the bread rack, and a third value with dark bread on the toast rack. Computations have been made, and the following values indicate the approximate capacitance values of the bread toasting compartment condenser $C_2$:

With light toast—17 mmfd.
With medium toast—15 mmfd.
With dark toast—13 mmfd.

The variable air condenser $C_1$, or 135 in Fig. 9 of the drawings, must therefore be adjustable between 31 mmfd. and 41 mmfd. Any type of toast between light and dark can then be obtained by setting the variable condenser 135 (or $C_1$) at any value between 17 and 13 mmfd.

It is therefore evident that when the capacitance of the bread toasting compartment condenser has decreased to a value which will make the voltage existing between the terminals of condenser $C_2$, that is between the plates 121 and 123, equal to that necessary to fire the tube 109, such firing will occur and cause a current to flow through coil 77, with the result that hook member 66 is released from latch 75 with quick upward movement of the bread carriers. The path of this release current may be traced as follows: from supply circuit conductor 91 through conductor 95, through the closed main switch comprising fixed contacts 97 and 99 and the bridging member 103, conductor 131, coil 77, conductor 127, through the tube 109 and through conductor 119 to the second supply circuit conductor 93.

Referring now to Fig. 10 of the drawings, I have there shown an electron tube 145 having a plate anode 147, a cold cathode 149, a control grid 151, and a screen grid 153. Plate 121 of the bread compartment condenser is connected to one terminal of a voltage doubling circuit 155 by a conductor 127, the opposite terminal whereof is connected by a conductor 157 to one terminal of an adjustable condenser 135, as well as to the plate anode 147. The voltage doubling circuit 155 comprises a pair of half-wave dry-type rectifiers 159 and 161 and two balanced condensers 163 and 165. The voltage is impressed upon the voltage doubling circuit 155 by a conductor 167 connected to supply circuit conductor 93 and to the junction of the two rectifiers 159 and 161, the opposite terminal being connected by a conductor 169 to the fixed contact 99, which, when the main switch is closed, is connected to the supply circuit conductor 91. Conductor 169 is connected also to one terminal of coil 77, the other terminal of coil 77 being connected by a conductor 173 to a fixed contact 175 of a small electromagnetic relay which comprises a second fixed contact 177 which is connected to conductor 167. The relay comprises also a coil 179, as well as an electromagnetic core 181, to which latter is secured a contact bridging member 183 adapted to engage with fixed contacts 175 and 177 when coil 179 is traversed by an electric current. The rectified voltage across the terminals of the voltage doubling circuit connected to conductors 127 and 157 is therefore approximately equal to twice the peak value of the A. C. supply voltage between conductors 91 and 93. This higher direct current voltage is impressed directly across the tube which when it becomes conducting, in substantially the same manner as was hereinbefore set forth in connection with Fig. 9, permits current flow therethrough from the voltage doubler circuit 155 through a circuit traceable as follows: through conductor 127, coil 179, cathode 149, tube 145, plate anode 147 and through conductor 157 to the other terminal of the voltage divider 155. This causes upward movement of bridging member 183 into engagement with the fixed contacts 175 and 177 whereby the circuit through coil 77 is closed substantially as follows: from supply circuit conductor 91, through conductor 95, closed main switch comprising fixed contacts 97, 99 and bridging member 103, coil 77, conductor 173, through the engaged contacts 175, 177 and bridging member 183, and conductor 167 to the other supply circuit conductor 93. This effects release of hook member 66 from the latch 75 and termination of a toasting operation.

Referring now to Fig. 11 of the drawings, I have there illustrated another diagram of connections, using a small radio type transformer instead of a voltage doubling rectifier circuit as shown in Fig. 10 of the drawings. Such a circuit may be employed when the toaster is designed for low voltage supply circuit conductors in order to operate the electron tube 109 which may be used with such a circuit. The primary winding 185 of the radio type transformer is connected across the supply circuit conductors 91 and 93, while the secondary winding 187 is connected to the two outer terminals of condenser 135, and the bread toasting compartment condenser comprising plates 121 and 123. In all other respects the diagram of circuits is substantially the same as that shown in Fig. 10, and its operation will therefore be evident.

In the toaster of Figs. 14-17 a single slice of bread is supported on the bread rack which comprises a vertically-transportable horizontal reach 202 on which is carried a bar 204 of electric insulating material preferably of porcelain or other highly refractory material. This bar 204 is adapted to support a single slice of bread, insulated from the frame, for toasting. The bread rack is shown in its lowermost position in Figs. 15 and 16, but slightly above the lowermost position in Fig. 14. For including the slice of bread in an electric condenser or capacitor, as a substantial part of the dielectric thereof, a pair of conductors flank the slice holder 204 so that the slice of bread being toasted will lie between them. While any of various constructions can be employed for such conductors, I provide a pair of glass plates 206 and 208, supported on insulators 210, each plate having on its outer surface remote from the bread, an electrically conducting layer which may be formed in the manner described in U. S. Patent 2,429,420, which coating leaves the glass transparent to heat and light. These glass plates 206 and 208 also constitute guides and lateral supports for holding the slice of bread erect.

For electrostatically shielding the condenser plates 206 and 208 from other electric potentials or fields in the toaster, an additional pair of conductors flank the plates 206 and 208. Although various constructions are also suitable for these conductors, I provide metal grids 212 and 214 supported in insulating bushings 216. For the toasting heaters I provide rod-like resistor elements 218 and 220 together with reflectors 222 and 224 for directing radiant heat through the openings of the shielding grids 212 and 214 and through the glass plates 206 and 208 to the bread supported on insulating bar 204.

The oven is substantially enclosed by the reflectors 222 and 224 and a pair of oven end-walls 226 and 228, which latter directly support the heating elements 218 and 220. The insulators 210 for the glass plates 206 and 208 extend through windows in the oven end-walls 226 and 228 and are supported on outer walls 230 and 232 which during the operation of the toaster will be much cooler than the end walls 226 and 228 of the oven. Similarly the top and bottom bars of the shield grids 212 and 214 also extend through windows of the oven walls and have their insulators 216 supported by the cooler, outer walls. It is to be noted also that the insulating bar 204, which supports the bread, extends through the oven end walls 226 and 228 and engages its supports outside the oven.

When the bread has been inserted, the bread rack 202—204 may be lowered manually to the position shown in Figs. 15 and 16 by pressing down on the handle 234, whereupon the rack is caught in its lowermost position by latch 236, which is held by spring 237. An electric solenoid magnet 238 is adapted when energized to disengage latch 236 to permit the bread rack to be raised by spring 240 to its uppermost position, in which position it supports the bread partly out of the oven so that it may be grasped by the hand. The face 242 of the latch 236 is inclined so that an upward pull on handle 234 will pull the bread carriage away from the latch for manual termination of a toasting operation.

As is shown in Fig. 17, electric power at 110 volts A. C. is supplied to conductors 244 and 246. A switch 248 operated directly by the bread rack 202 is closed when that rack is in its lowermost position. When so closed it supplies electric power to the toasting heaters 218 and 220 and also to a voltage-doubling rectifier 250 which includes a pair of rectifiers 252 and condensers 254. This doubler supplies direct current at approximately 250 volts to an electric oscillator 260 and to a trigger valve 262. While I may employ any of several kinds of oscillators, I have shown in this specific example, a multivibrator comprising thermionic valves 264 and 266. And while I may operate the multivibrator at any of a wide range of frequencies I prefer a frequency of approximately one million cycles per second. This high frequency taken from the plate or anode of valve 266 is connected through a condenser 268 and a filter 270 to one terminal of a variable condenser 276. Condenser 268 has a large electrostatic capacity compared to that of the bread condenser 206—208 and to that of condenser 276 and so offers a sufficiently low impedance path to the high frequency output of the multivibrator while blocking the flow of direct current. Filter 270 includes resistors 272 and condenser 274 for eliminating some of the extremely high-frequency components found in the square-wave output of the multivibrator 260.

The other terminal of variable condenser 276 is connected to the conductive coating of glass plate 208, and that of plate 206 is connected to the negative terminal 251 of the rectifier 250 of the D. C. supply. Thus the A. C. component of the voltage appearing at the anode of tube 266, less the components eliminated by filter 270, is impressed across the series combination of variable condenser 276 and the toast condenser 206—208. The variable condenser 276 serves as an adjustment for the degree of toasting desired and accordingly is intended to be set at some value and left there during the operation of the toaster. The condenser consisting of the plates 206—208 together with the slice of bread between them undergoes a reduction in its electrostatic capacity during the toasting operation because during that operation the moisture is driven out of the bread by the heat of the toasting heaters 218 and 220. Since the division of the voltage between the two condensers 206—208 and 276 is in a ratio inverse to that of their electrostatic capacities, this drying of the bread, by reducing the capacity of condenser 206—208, increases the proportional part of the voltage that appears thereacross. Shields 212 and 214 are connected to one terminal 251 of the D. C. supply to reduce the effect of extraneous electric fields on the capacitor plates 206 and 208. The voltage across the toast condenser 206—208 is applied across the control grid and cathode of the trigger valve 262, which in the specific example here described consists of an FG-33 or other vapor-filled, glow valve or Thyratron of the type that fires when its control grid reaches a certain positive potential with reference to its cathode. Resistor 282 provides a leak path for the D. C. from the control grid and has a resistance that is high compared with the impedance of condensers 276 and 206—208. The heaters for the cathodes of valves 262, 264 and 266 may be energized from conductors 244 and 246 in any known manner.

In operation, as the high-frequency A. C. voltage across condenser 206—208 increases during the toasting operation, the values of the successive positive peaks of the voltage applied to the control grid of tube 262 increase until tube 262 fires, that is, begins conducting current between its anode and cathode. This current energizes relay 286 which energizes magnet 238 which disengages latch 236 to permit the bread rack 202 to be lifted by spring 240 for terminating the toasting operation. The upward motion of the bread rack opens contacts 248 for disconnecting electric power from the toasting heaters and from the doubler 250.

I wish to here point out that the use of two condensers connected in series electric circuit with each other across the supply circuit, the first condenser being an adjustable air type condenser and the second being a bread compartment type of condenser consisting of two plates of a size comparable to the over-all dimensions of the toasting compartment does not provide a timing means which is a timer in the usual sense of the word. Where electronic or thermal or clock type timers are used, it is possible to place into the toasting compartment of a toaster having such a timer a slice of bread which has just been thoroughly toasted and the timer will again cause the electric toaster to go through its cycle, with the result that the slice of bread will be burned to a crisp. In a toaster equipped with a control, such as is described in this disclosure, if a slice of previously toasted bread is placed in the toaster for a second operation, the toasting operation would be terminated also immediately after its initiation, since the capacitance of the bread compartment condenser would be such as to cause termination of a toasting cycle.

Various modifications may be made in the device embodying my invention without departing from the spirit and scope thereof, and all such modifications coming clearly within the scope of the appended claims shall be considered as covered thereby.

I claim as my invention:

1. In an automatic electric cooker, the combination with means for initiating a cooking operation, and means for terminating said operation, of a pair of electric conductors, means for supporting an article of food between said conductors, whereby said conductors and article constitute a capacitive impedance element, means for heating said food for cooking it while so supported, and electric control means responsive to said conductors for actuating said terminating means when the electrostatic capacity between said two conductors attains a predetermined value said control means including an electric impedance element in series with said capacitive element, and also an electronic tube and apparatus controlled thereby operable in response to a predetermined voltage across one of said elements.

2. The combination of claim 1 wherein there is included a shield-conductor near one of the two first mentioned conductors on the side thereof away from said food-support, and a connection from the electric control means to said shield for controlling the electric potential thereof.

3. The combination of claim 2 wherein one of said conductors includes a transparent, electrically-conducting, glass-like sheet.

4. The combination of claim 2 wherein one of said conductors comprises a metal grid.

5. The combination of claim 1 wherein said food-supporting means includes insulating members for supporting said article of food and for substantially insulating it from members that lie outside the electric field between said two conductors.

6. The combination of claim 1 wherein there is included an electrostatic shield for that one of said two conductors that is connected to the second impedance element.

7. The combination of claim 1 wherein the cooking means includes heaters located beyond said conductors from an article of food on said supporting means.

8. The combination of claim 1 wherein said electric control means responds to an A. C. voltage across said two impedance elements.

9. The combination of claim 1 wherein there is included a generator of high frequency electric oscillations for impressing a high frequency voltage across said two impedance elements.

10. The combination of claim 1 wherein the second impedance element consists of a reference capacitor.

11. The combination of claim 1 wherein said cooking means include electric heaters located beyond said conductors from an article of food on said supporting means, and wherein there is included an electrostatic shield between that one of said conductors that is connected to said electric impedance element and the electric heater beyond it, and means for applying a controlled voltage to said shield.

12. In an automatic toaster, the combination with electric heaters for toasting and drying out a slice of bread, a switch for controlling said electric heaters biased to open position, means to close said switch to start a toasting operation and an electromagnetic latch to hold said switch in closed position, of means to cause release of said latch and termination of a toasting operation comprising a normally non-conducting electron tube, a pair of series connected condensers connected to said tube, one of said condensers having as its main dielectric a piece of bread being toasted, a source of electric energy for charging said pair of condensers, the potential across the terminals of said one condenser increasing with increasing dryness of a slice of bread being toasted until the potential is such as to fire said tube and means actuable by the current traversing said tube to effect release of the latch.

13. A toaster as set forth in claim 12 in which the second condenser is manually adjustable to vary the degree of toasting obtained during a toasting operation.

14. In an automatic toaster, the combination with electric heaters for toasting and drying out a slice of bread, a switch for controlling said electric heaters biased to open position, means to close said switch to start a toasting operation and an electromagnetic latch to hold said switch in closed position, of means to cause release of said latch and timing and termination of a toasting operation comprising a normally non-conducting electron tube, a pair of series connected condensers connected to said tube, one of said condensers having as its main dielectric a piece of bread being toasted, a source of electric potential for charging said pair of condensers, the potential across the terminals of the first one of said condensers increasing with increasing dryness of a slice of bread being toasted until the potential is such as to fire said tube, and means actuable by the current traversing the tube for terminating a toasting operation.

15. In an automatic electric cooker, the combination with a pair of electric resistance heaters, means for supporting an article of food between said heaters for cooking, means for initiating a cooking operation, and means for terminating said operation, of, two electric conductors, one between each of said heaters and the position of an article on said support whereby said conductors lie on opposite sides of said position and said conductors and an article in said position constitute a capacitive impedance element, a reference electric impedance element, one of said conductors having an electric connection thereto so that said two impedance elements are in series, an electrostatic shield between said one of said conductors and the heater adjacent it, and means for applying controlled voltages to said two impedance elements in series, and to said shield, and means responsive to a predetermined voltage across one of said impedance elements for actuating said terminating means.

16. In an automatic electric cooker, the combination with means for initiating a cooking operation, and means for terminating said operation, of, a pair of electric conductors, means for supporting an article of food between said conductors, whereby said conductors and article constitute a capacitive impedance element, means for heating said food for cooking it while so supported, and electric control means responsive to said conductors for actuating said terminating means to terminate a cooking operation, said control means including an electric circuit for said conductors for energizing them and electrically operated means controlled by said circuit and responsive therethrough to said conductors to actuate said terminating means when the electrostatic capacity between the two conductors attains a predetermined value.

17. The combination of claim 16 wherein there is included a shield-conductor near one of the two first mentioned conductors on the side thereof away from said food-support, and a connection from the electric control means to said shield for controlling the electric potential thereof.

18. The combination of claim 16 wherein said food-supporting means includes insulating members for supporting said article of food and for substantially insulating it from members that lie outside the electric field between said two conductors.

19. The combination of claim 16 wherein said cooking means includes electric heaters located beyond said conductors from an article of food on said supporting means, and wherein there is included a shield conductor between one of said heaters and the adjacent one of said first mentioned conductors, and a connection from the electric control means to said shield conductor for controlling the electric potential thereof.

20. In an automatic electric toaster, the combination with a casing housing a toasting chamber, electric heating elements for heating said chamber, means for energizing the heating elements to initiate a toasting operation and means for deenergizing the heating elements to terminate a toasting operation, of, a pair of electrical condenser plates mounted in spaced parallel relation on opposite sides of the toasting chamber, means for supporting a bread slice in toasting position between said plates, whereby the electrostatic capacity between the plates is subject to variation by the changing dielectric properties of a bread slice under toasting, and electric control means responsive to said condenser plates for actuating the deenergizing means to terminate a toasting operation, said electric control means including an electric circuit for said condenser plates for energizing them, and electronically operated means controlled by said circuit and responsive there through to said condenser plates to actuate said deenergizing means to terminate a toasting operation when the electrostatic capacity between said condenser plates attains predetermined value.

21. The combination of claim 20 wherein there is included in the electric circuit a manually adjustable variable capacitance device to which the electronically operated means also is responsive and being adapted to vary the toasting time for different degrees of toasting.

BROR G. OLVING.

REFERENCES CITED

The following references are of record in the file of this patent:

UNITED STATES PATENTS

| Number | Name | Date |
| --- | --- | --- |
| 1,985,051 | Minkler | Dec. 18, 1934 |
| 2,042,595 | Graham | June 2, 1936 |
| 2,293,851 | Rogers | Aug. 25, 1942 |
| 2,304,958 | Rouy | Dec. 15, 1942 |
| 2,382,168 | Otley et al. | Aug. 14, 1945 |
| 2,387,293 | Preston | Oct. 23, 1945 |
| 2,399,582 | Stevens | Apr. 30, 1946 |
| 2,431,195 | Olving | Nov. 18, 1947 |